United States Patent
Shi et al.

(10) Patent No.: US 9,385,763 B1
(45) Date of Patent: Jul. 5, 2016

(54) METHOD AND APPARATUS FOR IN-CHANNEL INTERFERENCE CANCELLATION

(71) Applicant: MOTOROLA SOLUTIONS, INC, Schaumburg, IL (US)

(72) Inventors: Qicai Shi, Coral Springs, FL (US); Neiyer S Correal, Cooper City, FL (US); Joseph P Heck, Ft Lauderdale, FL (US); Spyros Kyperountas, Weston, FL (US); Robert E Stengel, Pompano Beach, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/605,481

(22) Filed: Jan. 26, 2015

(51) Int. Cl.
*H04B 1/04* (2006.01)

(52) U.S. Cl.
CPC ...... *H04B 1/0475* (2013.01); *H04B 2001/0408* (2013.01)

(58) Field of Classification Search
CPC ...... H04B 1/1027; H04B 1/10; H04B 1/1036; H04B 1/525; H04B 1/709; H04B 1/71; H04B 7/15585; H04B 15/00; H04B 17/00; H04W 52/146; H04W 72/082; H04W 52/243; H04W 16/14; H04W 24/08; H04W 24/10; H04W 52/244; H04W 52/367; H04W 72/0453; H04W 72/0473
See application file for complete search history.

(56) References Cited

U.S. PATENT DOCUMENTS

| 7,127,211 | B2 | 10/2006 | Hildebrand et al. |
| 8,320,868 | B2 | 11/2012 | Pratt et al. |
| 8,837,636 | B2 | 9/2014 | Shi et al. |
| 2003/0063686 | A1 | 4/2003 | Giardina et al. |

(Continued)

FOREIGN PATENT DOCUMENTS

| GB | 2463244 A | 3/2010 |
| WO | 03073661 A1 | 3/2004 |
| WO | 2013131279 A1 | 9/2013 |

OTHER PUBLICATIONS

Tellado, Jose et al: "Maximum-Likelihood Detection of Nonlinearly Distorted Multicarrier Symbols by Iterative Decoding", IEEE Transactions on Communications, vol. 51, No. 2, Feb. 2003, all pages.

(Continued)

*Primary Examiner* — Golam Sorowar (57) ABSTRACT

A communication device includes a receiver that is capable of canceling in-channel interference. The receiver includes an antenna for receiving a wireless signal comprising in-channel components and an out-of-channel component, wherein the in-channel components comprise a desired component and an in-channel interference component. A first filter of the receiver filters the wireless signal by blocking at least a portion of the out-of-channel component to produce a first signal comprising the in-channel components, and at least a second filter of the receiver filters the wireless signal by blocking at least a portion of the in-channel components to produce a second signal comprising the out-of-channel component. An in-channel interference estimator of the receiver generates an in-channel interference estimation signal based on the second signal. And a combiner of the filter combines the first signal and the second signal to at least partially cancel the in-channel interference component of the first signal.

4 Claims, 6 Drawing Sheets

(56) References Cited

U.S. PATENT DOCUMENTS

| | | |
|---|---|---|
| 2011/0074506 A1 | 3/2011 | Kleider et al. |
| 2013/0065541 A1* | 3/2013 | Lum .................... H04W 16/14 455/77 |
| 2013/0077540 A1 | 3/2013 | Black et al. |
| 2013/0182663 A1* | 7/2013 | Ji ...................... H04W 72/0473 370/329 |
| 2014/0162712 A1 | 6/2014 | Feld et al. |

OTHER PUBLICATIONS

Mohsin Aziz, Meenakshi Rawat, and Fadhel M. Ghannouchi, "Rational Function Based Model for the Joint Mitigation of I/Q Imbalance and PA Nonlinearity", IEEE Microwave and Wireless Components Letters, vol. 23: Issue 4, pp. 196-198, Apr. 2013.

Lauri Anttila, Peter Händel, and Mikko Valkama, "Joint Mitigation of Power Amplifier and I/Q Modulator Impairments in Broadband Direct-Conversion Transmitters", IEEE Trans. Microwave Theory Tech., vol. 58, No. 4, pp. 730-738, Apr. 2010.

* cited by examiner

METHOD AND APPARATUS FOR IN-CHANNEL INTERFERENCE CANCELLATION

FIELD OF THE INVENTION

The present invention relates generally to wireless communication systems, and in particular to in-channel interference cancellation in a wireless communication system.

BACKGROUND OF THE INVENTION

When a broadband radio transmitter, such as a 700 MHz (Megahertz) Broadband Long Term Evolution (LTE) transmitter, is operating in the vicinity of a narrowband radio receiver, such as a Public Safety (PS) narrowband receiver, out-of-band emissions (OoBE) of the broadband transmitter may cause considerable interference to the narrowband PS receiver. The broadband transmitter's OoBE will sum with the noise of the receiver, resulting in a decrease in signal to interference -plus-noise ratio (SINR) at the narrowband PS receiver and thereby desensitize the receiver.

Figure 1:
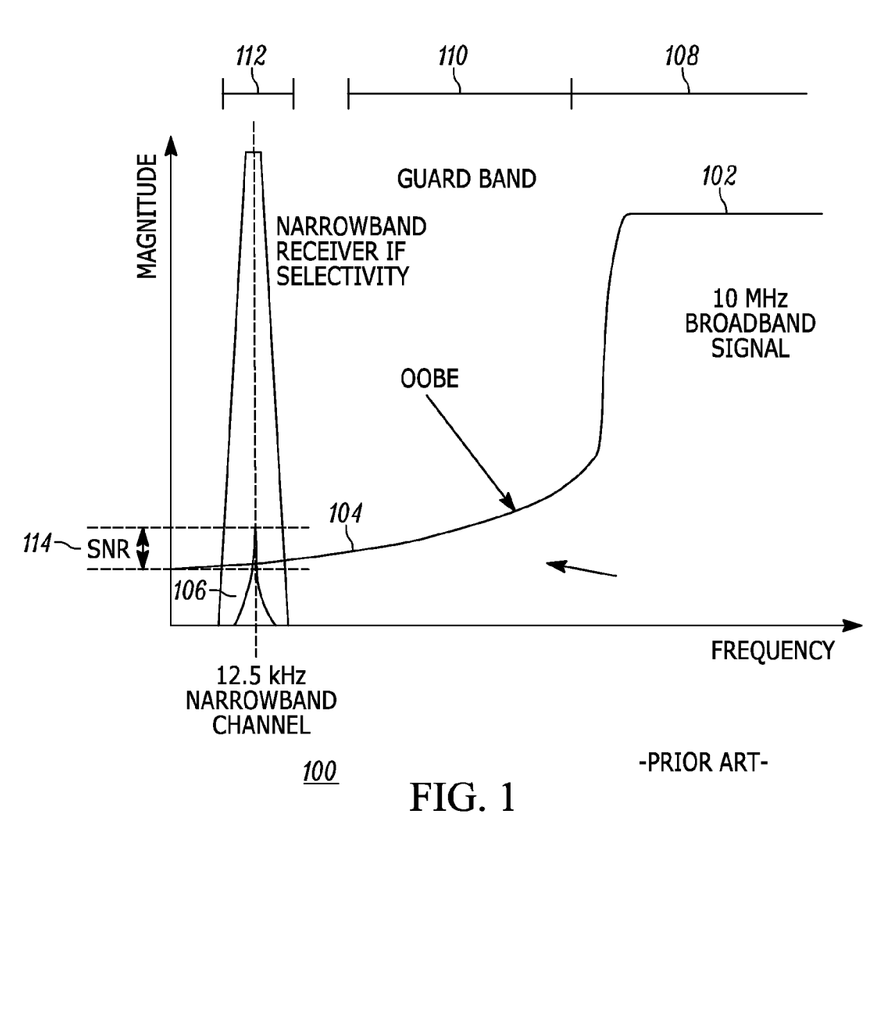
FIG. 1 is an exemplary spectral graph depicting a broadband signal whose frequency band is in close proximity to a frequency band of a narrowband signal.

For example, FIG. 1 is an exemplary spectral graph 100 depicting a broadband signal 102 whose frequency band 108 is in close proximity to the frequency band 112 of a narrowband signal 106. Despite the inclusion of a guard band 110 as a buffer between the broadband signal and adjacent signals, such as narrowband signal 106, an OoBE 104 of broadband signal 102 still spills into the bandwidth of narrowband signal 106, resulting in receiver desensitization, that is, reduced Signal-to-Noise Ratio (SNR) 114 at a narrowband receiver.

For example, such receiver desensitization is known to occur in cases such as the C band, where the close proximity of the C block uplink (transmit) band to the Public Safety Narrowband (receive) band causes desensitization of a narrowband receiver when in close proximity to a C band uplink transmitter. More specifically, in the 700-800 MHz band, the 1 MHz guard band separating the C band uplink (776-787 MHz) from the adjacent Public Safety Narrowband (PSNB) (769-775 MHz) may fail to adequately protect PSNB transmissions from interference from a nearby C band transmitter. While interference in the PSNB by the C band uplink transmissions may be mitigated by improved filtering at a C band transmitter, improving such filtering can be difficult and expensive to implement and retrofitting transmitters that belong to non-public safety (third) parties or the public poses significant challenges. Therefore, a need exists for a method and apparatus for channel interference cancellation in a wireless communication system in order to mitigate the above -described interference.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (e.g., CPU) or specialized processing apparatus (e.g., DSP). It will also be understood that the terms and expressions used herein have the ordinary technical meaning as is accorded to such terms and expressions by persons skilled in the technical field as set forth above except where different specific meanings have otherwise been set forth herein.

DESCRIPTION OF A PREFERRED EMBODIMENT

To address the need for a mitigation of in-channel interference, a communication device is provided that includes a receiver that is capable of canceling in-channel interference. The receiver includes an antenna for receiving a wireless signal comprising in-channel components and an out-of-channel component, wherein the in-channel components comprise a desired component and an in-channel interference component. A first filter of the receiver filters the wireless signal by blocking at least a portion of the out-of-channel component to produce a first signal comprising the in-channel components, and at least a second filter of the receiver filters the wireless signal by blocking at least a portion of the in-channel components to produce a second signal comprising the out-of-channel component. An in-channel interference estimator of the receiver generates an in-channel interference estimation signal based on the second signal. And a combiner combines the first signal and the second signal to at least partially cancel the in-channel interference component of the first signal.

Figure 2:
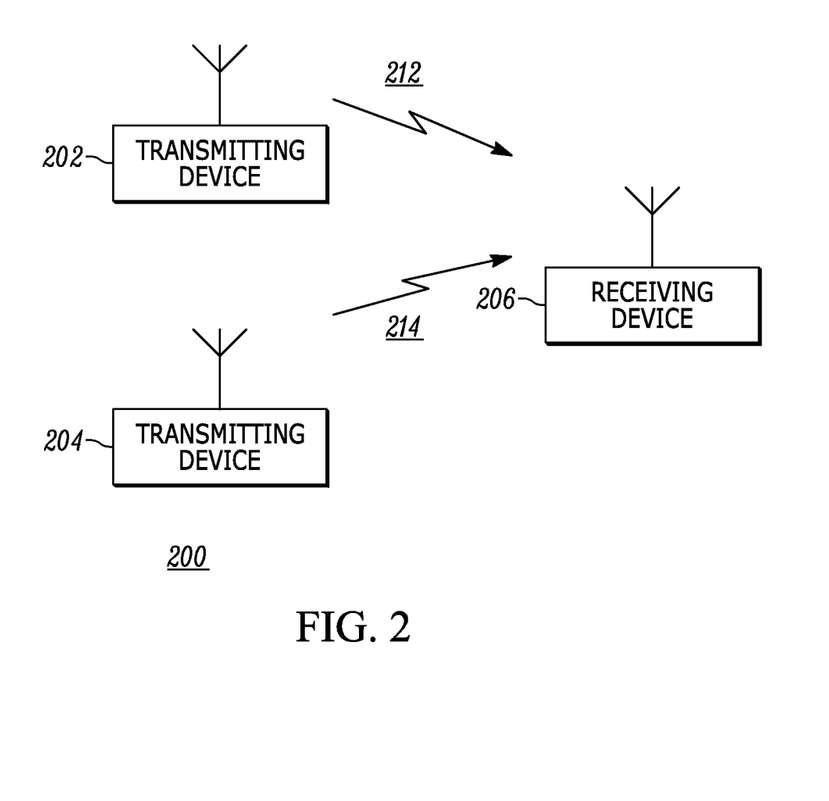
FIG. 2 is a block diagram of a wireless communication system in accordance with an embodiment of the present invention.

The present invention may be more fully described with reference to the figures. Turning now to the drawings, wherein like numerals designate like components, FIG. 2 is a block diagram of a wireless communication system 200 in accordance with an embodiment of the present invention. Communication system 200 includes multiple wireless transmitting communication devices 202, 204 (two shown) and a wireless receiving communication device 206 that is located in a coverage area of each of the transmitting communication devices. For example, each of transmitting communication devices 202, 204 may be a radio access network (RAN) access node such as a base station, a Node B, a Public Safety Base Station or an access point, or a User Equipment (UE) terminal, and receiving communication device 206 may be a user communication device such as a cellular telephone, a radiotelephone, a smartphone, or a personal digital assistant, laptop computer, tablet computer, or personal computer with wireless communication capabilities. However, in various embodiments of the present invention, one or more of transmitting communication devices 202 and 204 may be a user communication device and/or receiving communication device 206 may be a RAN access node. Each of transmitting communication device 202 and 204 transmits over a respective air interface 212, 214 that includes a forward link (not shown) and a reverse link (not shown).

Figure 3:
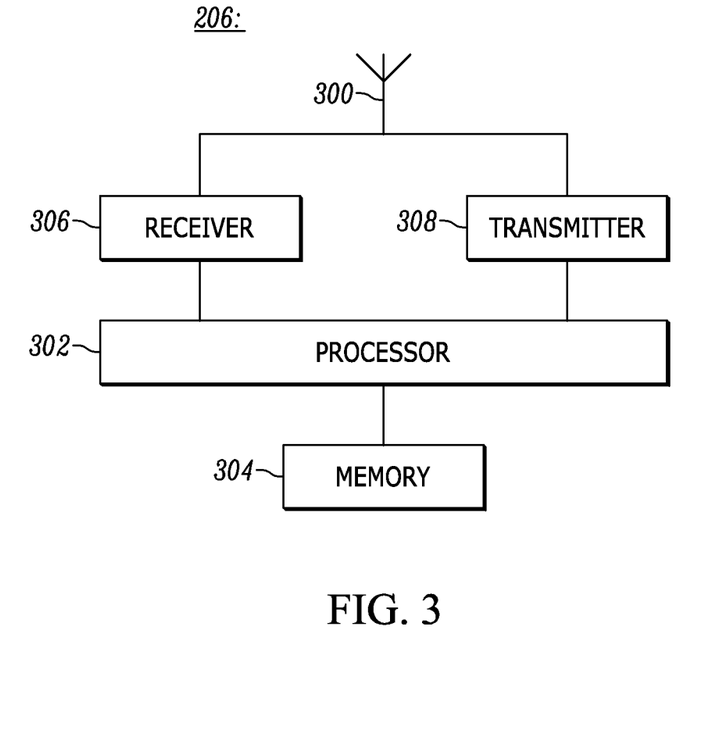
FIG. 3 is a block diagram of a wireless receiving communication device of FIG. 2 in accordance with various embodiments of the present invention.

FIG. 3 is a block diagram of receiving communication device 206 in accordance with various embodiments of the present invention. Receiving communication device 206 includes a processor 302, such as one or more microprocessors, microcontrollers, digital signal processors (DSPs), combinations thereof or such other devices known to those having ordinary skill in the art. Processor 302 is coupled to an at least one memory device 304, such as random access memory (RAM), dynamic random access memory (DRAM), and/or read only memory (ROM) or equivalents thereof, that maintains data and programs that may be executed by the processor and that allow the communication device to perform all functions necessary to operate in a wireless communication system. Communication device 206 further includes a receiver 306, and optionally may include a transmitter 308, that each are operationally coupled to processor 302 and to an antenna 300 and that provide for wirelessly receiving and transmitting messages by the communication device.

Communication system 200 may be any type of wireless communication wherein different devices transmit signals at different frequencies, even if some transmitting devices share a frequency bandwidth. For example, communication system 200 may comprise one or more of a Frequency Division Multiple Access (FDMA) communication network, a Global System for Mobile communications (GSM) communication network, a Code Division Multiple Access (CDMA) communication network, any type of communication network that employs an Orthogonal Frequency Division Multiplexing (OFDM) modulation scheme, such as a 3GPP (Third Generation Partnership Project) E-UTRA (Evolutionary UMTS Terrestrial Radio Access) communication network, a 3GPP2 (Third Generation Partnership Project 2) Evolution communication network, for example, an Ultra Mobile Broadband (UMB) communication network, a Worldwide Interoperability for Microwave Access (WiMAX) communication network that operates in accordance with the IEEE (Institute of Electrical and Electronics Engineers) 802.16 standards, a Wireless Local Area Network (WLAN) communication system as described by the IEEE 802.xx standards, for example, the 802.11a/HiperLAN2, 802.11g, or 802.20 standards, or any of multiple proposed ultrawideband (UWB) communication networks.

The multiple transmitting communication devices 202, 204 may be operated by a same network operator and may be part of a same communication network, or one or more of the multiple transmitting communication devices 202, 204 may be operated by a different network operator and be part of a different communication network than another transmitting communication device of the multiple transmitting communication devices. For example, a first transmitting communication device 202 of the multiple transmitting communication devices 202, 204 may comprise a broadband transmitter, such as a 700 MHz (Megahertz) Broadband Long Term Evolution (LTE) transmitter, transmitting in the C band (776-787 MHz), while a second transmitting communication device 204 of the multiple transmitting communication devices 202, 204 may comprise a narrowband transmitter, such as a Public Safety (PS) narrowband transmitter, transmitting in the adjacent Public Safety Narrowband (PSNB) (769-775 MHz) and separated from the C band by a 1 MHz guard band.

When coverage areas 212 and 214 of transmitting communication devices 202 and 204 overlap, it is possible that a communication device, such as receiving communication device 206, located in the area of overlap and served by one of the multiple transmitting communication devices 202, 204, for example, by a first transmitting communication device 202, may receive transmissions from both serving transmitting communication device 202 and a second transmitting communication device 204. In such an instance, out-of-channel emissions, or out-of-band emissions (OoBE), related to transmissions by second transmitting communication device 204 may produce in-channel interference with respect to desired signals received from the first transmitting communication device 202. Such in-channel interference can desensitize receiver 306 of receiving communication device 206 and prevent the receiving communication device from correctly demodulating and decoding desired signals from first transmitting communication device 202. Therefore, communication system 200 minimizes the effect of such in-channel interference by providing for cancellation, by a receiving communication device, of in-channel interference generated by out-of-channel transmissions, thereby facilitating an ability of the receiving communication device to correctly demodulate and decode in-channel signals in the presence of such interference.

Figure 4:
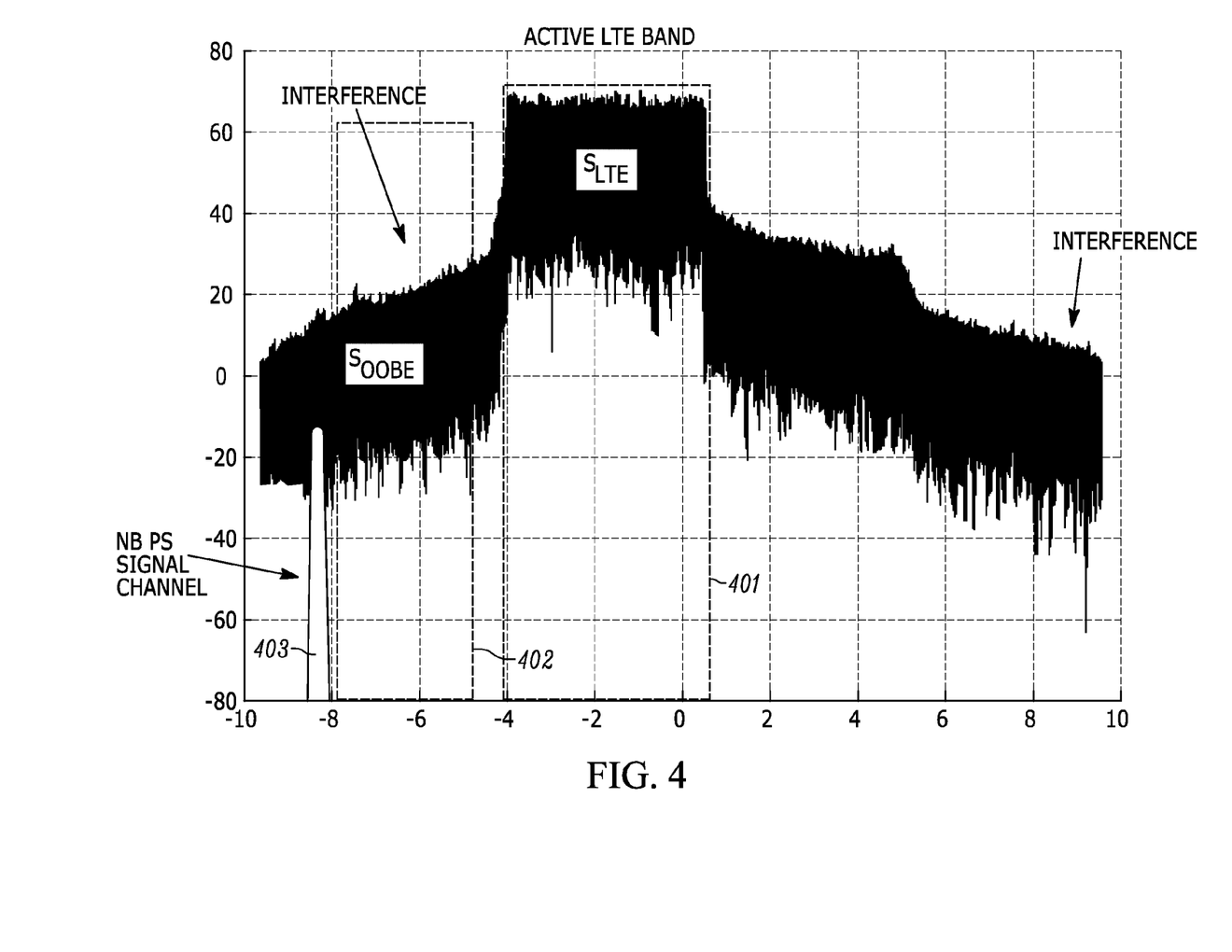
FIG. 4 is an exemplary spectral graph depicting a broadband signal whose frequency band is in close proximity to a frequency band of a narrowband signal.
Figure 5:
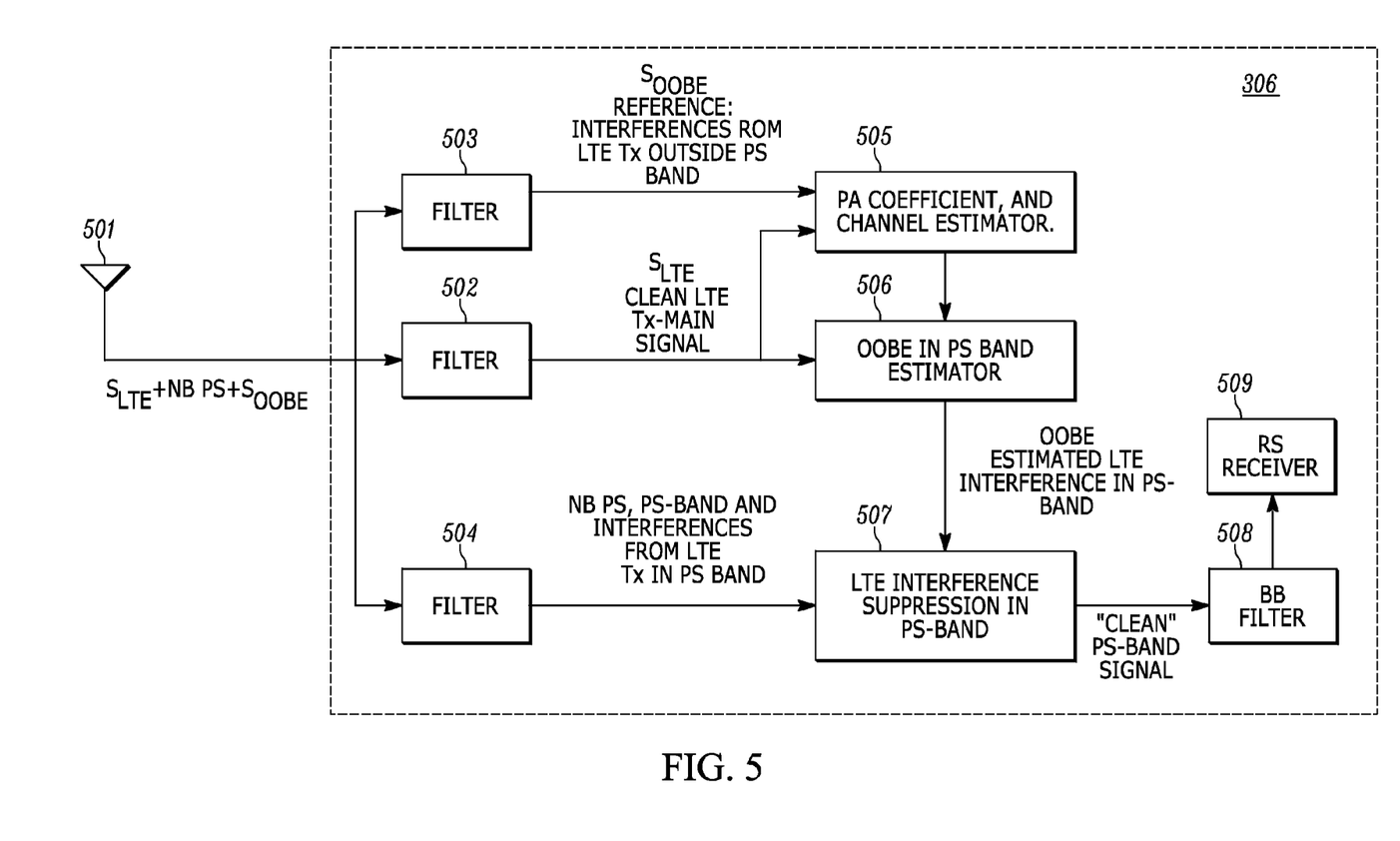
FIG. 5 depicts an architecture of the receiver of the wireless receiving communication device of FIG. 2 in accordance with another embodiment of the present invention.

FIG. 4 is an exemplary spectral graph depicting a broadband signal whose frequency band is in close proximity to a frequency band of a narrowband signal. In order to help describe the embodiment shown in FIG. 5, FIG. 4 shows three particular bands utilized by the receiver 306 when performing interference cancellation. In particular, active wideband transmission ($S_{LTE}$) 401, interference ($S_{OOBE}$) 402, and a narrowband channel (NB PS) 403 are illustrated. As described, wideband transmission 401 is preferably generated by transmitter such as a 700 MHz (Megahertz) Broadband Long Term Evolution (LTE) transmitter. This transmission causes interference, for example, interference 402 that lie outside transmission 401. It should be noted that interference 402 has a portion that exist outside narrowband channel 403, and a portion that interferes with narrowband channel 403. In this particular example, interference portion 402 lies outside both signals 401 and 403. Finally, narrowband channel 403 is preferably a narrowband transmission generated by a transmitter, such as a Public Safety (PS) narrowband transmitter.

It should be noted that interference portion 402 may comprise many different types of interference. Such interference includes side lobes created by a modulation scheme used by a wideband transmitter as well as of band emissions due to the non-linear effects of a wideband power amplifier (PA). It is the latter interference (which may be thought of as "spectral re-growth" due to non linear PA effects) that is cancelled by the receiver of FIG. 5.

FIG. 5 depicts receiver 306 in more detail. As shown receiver 306 comprises antenna 501, filters 502-504, Power Amplifier (PA) coefficient estimator 505, OOBE in NBPS band estimator 506, Interference suppression circuitry 507, baseband filter 508, and narrowband receiver 509. It should be noted that while estimators 505 and 506, and suppression circuitry 507 are shown as stand-alone components, these function of these components may take place using microprocessor 302. During operation, antenna 501 receives at least the three frequency bands 401, 402, and 403 as a received RF signal. Antenna 501 routes a received RF signal to each of the multiple filters for example, by use of a signal splitter (not shown) or by use of one or more signal sampling devices such as a directional couplers (not shown). Filter 502 filters the received signal to produce $S_{LTE}$ 401 without signals 402 or 403. Similarly, filter 503 filters the received signal to produce $S_{OOBE}$ 402 without signals 401 or 403. Finally, filter 504 filters the received signal to produce NB PS 403 without signals 401 or 402.

Using the output of filter 502 ($S_{LTE}$) and the reference which is the output of filter 503 ($S_{OOBE}$) estimator 505 estimates the coefficients of the assumed PA model. Then the output of filter 502 ($S_{LTE}$) is used as an input to the PA model with the estimated coefficients to generate an estimate of the interference in the PS Band. This is done in estimator 506. This is described in more detail below.

During operation, $S_{LTE}$ 401 enters PA coefficient estimator 505 where a power amplifier model coefficients are estimated. As one of ordinary skill in the art will recognize, power amplifier model coefficients are the coefficients from a memory polynomial model of the Power Amplifier. With the memory based baseband polynomial model, the PA output is represented as $$y_n = \sum_{m=0}^{L} s_{n-m} \sum_{k=1}^{P} \alpha_{km} |s_{n-m}|^{k-1}$$

and the $\alpha_{km}$ are the memory polynomial model coefficients that provide the best description of the power amplifier, L is the maximum delay in samples and P is the order of polynomial considered. As one of ordinary skill in the art will recognize, other PA models could also be used, with interference being cancelled as described below by estimating model coefficients.

Estimator 505 calculates:

$$\overline{S}_{LTE} = S_{LTE} / \sqrt{\text{mean}(S_{LTE}^2)}$$

$$S_{3rd} = (|\overline{S}_{LTE}|)^2 * S_{LTE}$$

$$S_{5th} = (|\overline{S}_{LTE}|)^4 * S_{LTE}$$

$$S_{7th} = (|\overline{S}_{LTE}|)^6 * S_{LTE}.$$

Estimator 505 then band-pass filters the above to produce:

$$S'_{3rd} = \text{Bandpass\_Filter}(S_{3rd})$$

$$S'_{5th} = \text{Bandpass\_Filter}(S_{5th})$$

$$S'_{7th} = \text{Bandpass\_Filter}(S_{7th})$$

Estimator 505 then uses a minimum mean squared error (MMSE) criterion to find the coefficients of the $3^{rd}$ term, $5^{th}$ term and $7^{th}$ term by finding the vector $\alpha$ that minimizes:

$$\underset{\vec{\alpha}}{\text{argmin}} \left\| S_{OOBE} - \vec{\alpha} \cdot \vec{S'} \right\|$$

Where $$\vec{\alpha} = [\alpha_{31}\alpha_{32} \ldots \alpha_{52}\alpha_{51}\alpha_{52} \ldots \alpha_{52}\alpha_{71}\alpha_{72} \ldots \alpha_{72}]$$

and $$\vec{S'} = \begin{bmatrix} S'_{3rd}(n) \\ S'_{3rd}(n-1) \\ \vdots \\ S'_{3rd}(n-L+1) \\ S'_{5th}(n) \\ S'_{5th}(n-1) \\ \vdots \\ S'_{5th}(n-L+1) \\ S'_{7th}(n) \\ S'_{7th}(n-1) \\ \vdots \\ S'_{7th}(n-L+1) \end{bmatrix}$$

Thus, the vector of coefficients $\vec{\alpha}$ is found to minimize an error between the actual interference signal and the estimate of the interference signal. The estimate is a function of the $\vec{\alpha}$ coefficients.

It should be noted that L is an integer, L>=1. For L>1, for when the 3rd, 5th, 7th correction terms include memory effects. Thus each correction term to be estimated, is now also dependent on past samples of the signal and not only current ones. For example if L=2 each correction term (3rd, 5th, 7th) will now have 2 coefficients, one for the current sample and one for the sample that came before.

The power amplifier coefficients $\vec{\alpha} = [\alpha_{31}\alpha_{32} \ldots \alpha_{32}\alpha_{51}\alpha_{52} \ldots \alpha_{50}\alpha_{71}\alpha_{72} \ldots \alpha_{72}]$ are utilized along with $S_{OOBE}$ 402 to estimate the OOBE that exists within NB PS 403 (estimated interference). This is accomplished by circuitry 506 linear combining the $3^{rd}$ term, $5^{th}$ term and $7^{th}$ term to get the estimated OOBE signal within band 403. More particularly, $$\hat{S}_{OOBE} = \vec{\alpha} \cdot \vec{S}$$

Where $$\vec{S} = \begin{bmatrix} S_{3rd}(n) \\ S_{3rd}(n-1) \\ \vdots \\ S_{3rd}(n-L+1) \\ S_{5th}(n) \\ S_{5th}(n-1) \\ \vdots \\ S_{5th}(n-L+1) \\ S_{7th}(n) \\ S_{7th}(n-1) \\ \vdots \\ S_{7th}(n-L+1) \end{bmatrix}$$

The estimated interference is passed to interference suppression circuitry 507 where it is subtracted from NB PS 403 to produce a clean NB PS. More particularly, circuitry 507 produces $\hat{S} = S - \hat{S}_{OOBE}$, and passes this to filter 508 and ultimately to receiver 509.

Figure 6:
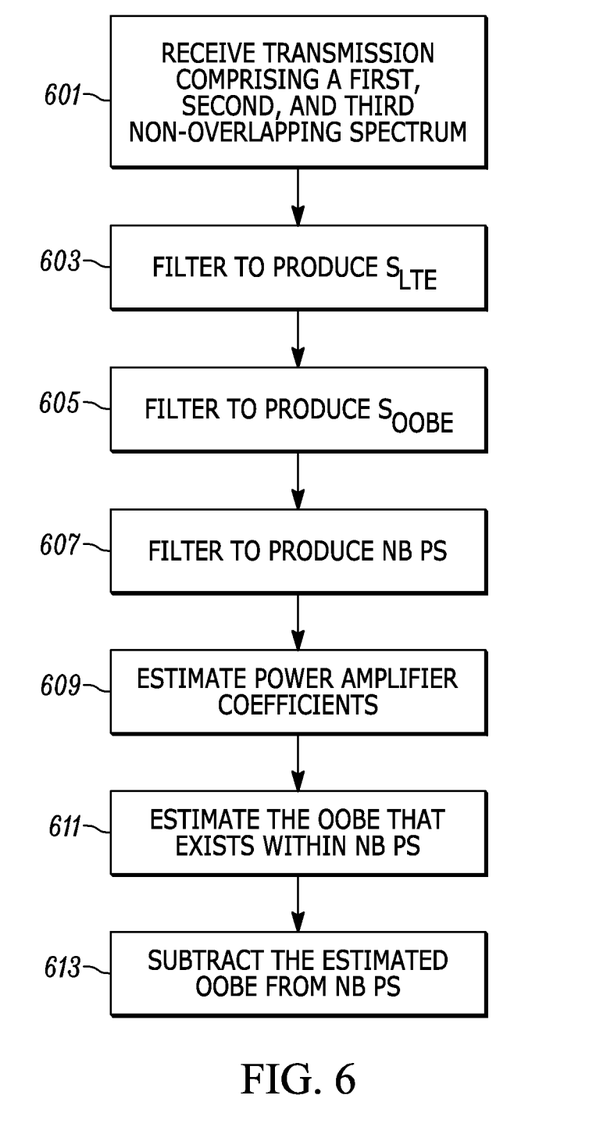
FIG. 6 is a logic flow diagram illustrating a method by which the wireless receiving communication device of FIG. 2 cancels in-channel interference in accordance with an embodiment of the present invention.

FIG. 6 is a logic flow diagram illustrating a method by which the wireless receiving communication device of FIG. 2 cancels in-channel interference in accordance with an embodiment of the present invention. The logic flow begins at step 601 where antenna 501 receives a radio-frequency transmission comprising a first, second, and third non-overlapping portions of spectrum. More particularly, antenna 501 receives $S_{LTE}+S_{OOBE}+$NB PS. Filter 502 filters the received signal to produce $S_{LTE}$ 401 without signals 402 or 403 (step 603). Similarly, filter 503 filters the received signal to produce $S_{OOBE}$ 402 without signals 401 or 403(step 605). Filter 504 filters the received signal to produce NB PS 403 without signals 401 or 402 (step 607). It should be noted that NB PS 403 does contain interference caused from a wideband transmitter (as discussed above). At step 609 $S_{LTE}$ 401 and $S_{OOBE}$ enters PA coefficient estimator 505 where power amplifier coefficients are estimated. More particularly, the first and the second non-overlapping portions of spectrum are used to estimate power amplifier coefficients used to generate the first and the second portions of spectrum.

The estimated power amplifier coefficients are utilized along with $S_{OOBE}$ 402 at step 611 to estimate the OOBE that exists within NB PS 403 (estimated interference). In other words, the estimated power amplifier coefficients are used to predict interference within the third portion of spectrum. Finally, at step 613 the estimated interference is passed to interference suppression circuitry 507 where it is subtracted from NB PS 403 to produce a clean NB PS that is passed to filter 508 and ultimately to receiver 509. As is evident the estimated/predicted interference is used to cancel interference within the third portion of spectrum.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for interference cancellation in a wireless communication system, the method comprising the steps of:
  receiving first, second, and third non-overlapping portions of spectrum;
  using the first and the second non-overlapping portions of spectrum to estimate power amplifier coefficients used to generate the first and the second portions of spectrum;
  using the power amplifier coefficients to predict interference within the third portion of spectrum;
  using the predicted interference to cancel interference within the third portion of spectrum; and
  wherein the step of using the first and the second non-overlapping portions of spectrum to estimate power amplifier coefficients comprises the step of using a minimum mean squared error (MMSE) criterion to find coefficients of a $3^{rd}$ term, $5^{th}$ term and $7^{th}$ by finding vector $\alpha$ that minimizes:

$$\operatorname*{argmin}_{\vec{\alpha}} \left\| S_{OOBE} - \vec{\alpha} \cdot \vec{S'} \right\|,$$

where $$\vec{\alpha} = [\alpha_{31}\alpha_{32}\ldots\alpha_{32}\alpha_{51}\alpha_{52}\ldots\alpha_{52}\alpha_{71}\alpha_{72}\ldots\alpha_{71}].$$

2. The method of claim 1 wherein the first, second, and third non-overlapping portions of spectrum comprise a wideband transmission ($S_{LTE}$), an interference ($S_{OOBE}$), and a narrowband channel (NB PS), respectively.

3. The method of claim 1 further comprising the steps of:
  calculating
  $\overline{S}_{LTE} = S_{LTE}|\sqrt{\operatorname{mean}(S_{LTE}{}^2)}$, $S_{3rd} = (|\overline{S}_{LTE}|)^{2*}S_{LTE}$, $S_{5th} = (|\overline{S}_{LTE}|)^{4*}S_{LTE}$, $S_{7th} = (|\overline{S}_{LTE}|)^{6*}\overline{S}_{LTE}$,
  $S'_{3rd}$=Bandpass_Filter($S_{3rd}$),
  $S'_{5th}$=Bandpass_Filter($S_{5th}$),
  $S'_{7th}$=Bandpass_Filter($S_{7th}$), and wherein $$\vec{S'} = \begin{bmatrix} S'_{3rd}(n) \\ S'_{3rd}(n-1) \\ \vdots \\ S'_{3rd}(n-L+1) \\ S'_{5th}(n) \\ S'_{5th}(n-1) \\ \vdots \\ S'_{5th}(n-L+1) \\ S'_{7th}(n) \\ S'_{7th}(n-1) \\ \vdots \\ S'_{7th}(n-L+1) \end{bmatrix}.$$

4. An apparatus comprising:
at least one antenna receiving first, second, and third non-overlapping portions of spectrum;
a first estimator using the first and the second non-overlapping portions of spectrum to estimate power amplifier coefficients used to generate the first and the second portions of spectrum;
a second estimator using the power amplifier coefficients to predict interference within the third portion of spectrum;
interference suppression circuitry using the predicted interference to cancel interference within the third portion of spectrum,
wherein the first, second, and third non-overlapping portions of spectrum comprise a wideband transmission ($S_{LTE}$), an interference ($S_{OOBE}$) 402, and a narrowband channel (NB PS), respectively; and
wherein, the power amplifier coefficients comprise coefficients of a $3^{rd}$ term, $5^{th}$ term and $7^{th}$ term of a vector $\alpha$ that minimizes $$\underset{\vec{\alpha}}{\text{argmin}} \left\| S_{OOBE} - \vec{\alpha} \cdot \vec{S'} \right\|$$

\* \* \* \* \*